US012728990B2

(12) United States Patent
Ibacoglu et al.

(10) Patent No.: US 12,728,990 B2
(45) Date of Patent: Sep. 8, 2026

(54) AIR VEHICLE

(71) Applicant: Tusas- Turk Havacilik Ve Uzay Sanayii Anonim Sirketi, Kahramankazan (TR)

(72) Inventors: Hasan Ibacoglu, Kahramankazan (TR); Burhan Sahin, Kahramankazan (TR)

(73) Assignee: Tusas- Turk Havacilik Ve Uzay Sanayii Anonim Sirketi, Kahramankazan (TR)

( * ) Notice: Subject to any disclaimer, the term of this patent is extended or adjusted under 35 U.S.C. 154(b) by 0 days.

(21) Appl. No.: 19/107,625

(22) PCT Filed: Aug. 22, 2023

(86) PCT No.: PCT/TR2023/050842
§ 371 (c)(1),
(2) Date: Feb. 28, 2025

(87) PCT Pub. No.: WO2024/049387
PCT Pub. Date: Mar. 7, 2024

(65) Prior Publication Data

US 2025/0376258 A1 Dec. 11, 2025

(30) Foreign Application Priority Data

Aug. 31, 2022 (TR) ............................... 2022/013608

(51) Int. Cl.
*B64C 27/615* (2006.01)
*B64C 9/32* (2006.01)
(Continued)

(52) U.S. Cl.
CPC .............. *B64C 27/615* (2013.01); *B64C 9/32* (2013.01); *B64C 27/06* (2013.01); *B64C 27/467* (2013.01)

(58) Field of Classification Search
CPC .................................................... B64C 27/615
See application file for complete search history.

(56) References Cited

U.S. PATENT DOCUMENTS 2,624,531 A * 1/1953 Stalker .................. B64C 27/615 416/24
3,246,862 A 4/1966 Celniker et al.
(Continued)

FOREIGN PATENT DOCUMENTS

CN 111470039 7/2020
WO WO 99/12809 3/1999

OTHER PUBLICATIONS

International Search Report and the Written Opinion Dated Dec. 13, 2023 From the International Searching Authority Re. Application No. PCT/TR2023/050842. (10 Pages).

*Primary Examiner* — Juan G Flores

(57) ABSTRACT

An air vehicle comprising a body, an engine mounted on the body configured to generate force for flight, a rotor coupled with the engine and configured to rotate, a shaft positioned within the rotor and configured to be driven by the engine, a plurality of blades connected with the shaft, and a plurality of flaps wherein each flap is located on a respective blade. Each flap has a closed position in which the flap corresponds to an aerodynamic surface of the respective blade without extending outward, and an open position in which the flap extends outward and increases drag force acting on the rotor. A plurality of fasteners positioned in the blades allow the flaps to be attached movably. A triggering member extends along the shaft and is mechanically coupled with the shaft, the triggering member being movable relative to the shaft and comprising at least one protrusion extending outward from the triggering member for contacting the fasteners.

8 Claims, 4 Drawing Sheets

(51) Int. Cl.

| | |
|---|---|
| ***B64C 27/06*** | (2006.01) |
| ***B64C 27/467*** | (2006.01) |

(56) References Cited

U.S. PATENT DOCUMENTS

| | | | | |
|---|---|---|---|---|
| 4,461,611 | A * | 7/1984 | Michel | B64C 27/615 416/31 |
| 6,109,870 | A | 8/2000 | Yamakawa | |
| 7,014,142 | B2 | 3/2006 | Barocela et al. | |
| 2005/0224633 | A1 | 10/2005 | Barocela et al. | |
| 2006/0266879 | A1 | 11/2006 | Svoboda, Jr. | |
| 2013/0082136 | A1 | 4/2013 | Schank et al. | |
| 2015/0104307 | A1 | 4/2015 | Foskey et al. | |
| 2018/0171975 | A1* | 6/2018 | Röhm | F03D 1/0675 |

* cited by examiner

AIR VEHICLE

RELATED APPLICATIONS

This application is a National Phase of PCT Patent Application No. PCT/TR2023/050842 having International filing date of Aug. 22, 2023, which claims the benefit of priority of Turkey Patent Application No. 2022/013608 filed on Aug. 31, 2022. The contents of the above applications are all incorporated by reference as if fully set forth herein in their entirety.

FIELD AND BACKGROUND OF THE INVENTION

This invention relates to an aero mechanical brake mechanism created for a rotor brake system used in a rotary wing air vehicle.

Unlike an airplane, a rotary wing air vehicle uses the rotor as both a transport and a propulsion element, as well as a control element. As a result of the rotational movement of the rotor, the helicopters can hang in the air, but with a high-power consumption. In airplanes, on the other hand, the lift is provided by the wing aerodynamics, and power is consumed to provide sufficient thrust to overcome the fuselage drag. The flow on the blade reaches high speeds with the rotation of the blade while the helicopter is flying in a vertical direction. In order to use the helicopter blade as an airplane wing, the blade, which remains at an opposite angle after the rotor is stopped, must be rotated 180 degrees to be moved to a required position relative to the flow. This creates an action that is structurally challenging, risky to stability, and complex to control. Since the elliptical flaps have the same geometry on both the trailing edge and the leading edge, they can be easily moved to the required position by simply correcting the angle, without rotating the blade. Similar to the normal flap, the most suitable blade geometry can be achieved by optimizing the change of hump and thickness ratio along the blade.

U.S. Pat. No. 3,246,862A2, which is included in the known-state of the art, discloses that a rotor speed, which is maintained by the engines and propellers when a sufficient forward flight mode is achieved on the air vehicle, is decelerated by appropriate control of the rotor drive power means and movement of the air vehicle. The rotor speed is controlled by a pump in the brake system of the air vehicle.

CN111470039A, which is included in the known-state of the art, discloses a rotor control system suitable for a heavy-duty rotary wing air vehicle with stepped propellers. A stepped propeller system consisting of an upper propeller system and a lower propeller system is adopted in the air vehicle, and an elevator type auxiliary propeller is disclosed.

U.S. Pat. No. 7,014,142B2, which is included in the known-state of the art, discloses a low-drag rotor/wing flap. An apparatus in the air vehicle can advantageously reduce friction on the rotor/blades during airplane mode or helicopter mode.

US2015104307A1, which is included in the known-state of the art, discloses an actuation system for an active blade element of a rotor blade includes an actuator system coupled to a linear transmission system. The actuator system attaches to a structure within a rotor blade and provides a linear motion in a direction that is spanwise to the rotor blade.

SUMMARY OF THE INVENTION

An air vehicle according to the present invention both has vertical landing and take-off helicopter capabilities, and enables the rotor to act as a wing by stopping the rotating rotor, in order to stay in the air longer and to travel faster in the air by gliding in the air like an airplane.

By creating air drag with the flaps on the blade, braking is almost entirely provided by mechanical effects.

Another object of the invention is to provide a modular and flexible brake mechanism for a rotary wing air vehicle.

The air vehicle realized to achieve the object of the invention, which is illustrated in the first claim and other claims dependent thereon, comprises a body; at least one engine on the body that produces the necessary force for the flight of the air vehicle; at least one rotor which rotates in association with the engine upon a force received therefrom, thereby creating the necessary lifting force for the air vehicle; at least one shaft in the rotor, which rotates around an axis along which it extends on the body; a plurality of blades connected to the shaft; at least one flap movable on the blade; a closed position (C) in which the flap corresponds to the blade surface so as not to protrude therefrom; an open position (O), wherein the flap is moved from the closed position (C) to the open position (O), so that it extends outward from the blade, increasing the drag force acting on the rotor; a plurality of fasteners in the blade that allow the flaps to be mounted on the blade movably.

The air vehicle according to the invention comprises a triggering device which is movable in the shaft relative to the shaft, and which moves the fasteners simultaneously around their own axis and along the direction they extend, thus allowing the flap to rotate on the blade.

In an embodiment of the invention, the air vehicle comprises the triggering device that moves the flaps from the closed position (C) to the open position (O) when the blades are positioned in the advanced side relative to the direction of the air vehicle movement during the rotation of the blades, and moves the flaps from the open position (O) to closed position (C) when the flaps are positioned in the receding side, thereby creating a drag on the engine to decelerate the rotor.

In an embodiment of the invention, the air vehicle comprises the triggering device extending on the shaft to be movable in the shaft; at least one protrusion on the trigger; a first position in which the protrusion contacts with the fasteners to move the fasteners; a second position to which the triggering device is brought by moving in the shaft, and in which the protrusion does not trigger the fasteners.

In an embodiment of the invention, the air vehicle comprises at least one bracket through which a fastener passes; at least one opening on the bracket; at least one pin extending from the fastener towards the opening and moving through the opening; wherein the pin slides in the opening upon a force applied to the fastener by the protrusion, thereby enabling the fastener to move both around itself and along the direction it extends.

In an embodiment of the invention, the air vehicle comprises at least one spring between the bracket and the fastener, which moves the fastener back when the fastener passes to the receding side, thereby enabling the flap to move from the open position (O) to the closed position (C).

In an embodiment of the invention, the air vehicle comprises at least one actuator that moves the triggering device relative to the shaft; a control unit that enables the actuator to move the trigger, either by user request or in an automatically activated manner.

In an embodiment of the invention, the air vehicle comprises a brake system on the body, which enables the rotor to be stopped completely when the rotor reaches a certain speed; at least one sensor that measures the rotor rotation speed and transmits the measurement data to the control unit; the control unit using data from the sensor and sending a command to the brake system to stop the rotor completely when the rotor speed is decreased to the speeds predetermined by the user.

In an embodiment of the invention, the air vehicle comprises the control unit that decelerates and stops the rotor completely by: interrupting the force to the rotor when transmission clutch, which transmits engine movements to the rotor, is released; moving the triggering device by the actuator from the second position to the first position upon an input transmitted by the control unit; contacting the protrusion with the fasteners, respectively, to move the fasteners along the direction they extend, rotatable around their own axis; moving the flap or flaps, which have been positioned in the advanced side of the blade, from the closed position (C) to the open position (O); disconnecting the protrusion from the fastener when the blade is positioned in the advanced side; retracting the fastener that does not contact with the protrusion when the blade is positioned in the retracting side, so that the flap is moved from the open position (O) to the closed position (C); moving the triggering device by the actuator from the first position to the second position when the rotor speed drops below the speed set by the user; and activating the brake system and stopping the rotor completely.

In an embodiment of the invention, the air vehicle comprises a plurality of protrusions of varying size and width on the triggering device, which extend outward from the triggering device.

In an embodiment of the invention, the air vehicle comprises the blade with an elliptical cross-section; and flaps that correspond to the blade surface without protruding.

In an embodiment of the invention, the air vehicle comprises at least one support arm located on the blade in connection with the fastener and keeping the flap in the open position (O) by transmitting the movement of the bar to the flap.

In an embodiment of the invention, the air vehicle comprises the pin, whose movement is limited by the walls of the opening, thus enabling adjustment of the extent that the flaps extend outward from the blade.

BRIEF DESCRIPTION OF THE SEVERAL VIEWS OF THE DRAWINGS

The air vehicle realized to achieve the object of the present invention is illustrated in the attached drawings, in which.

DESCRIPTION OF SPECIFIC EMBODIMENTS OF THE INVENTION

Figure 1:
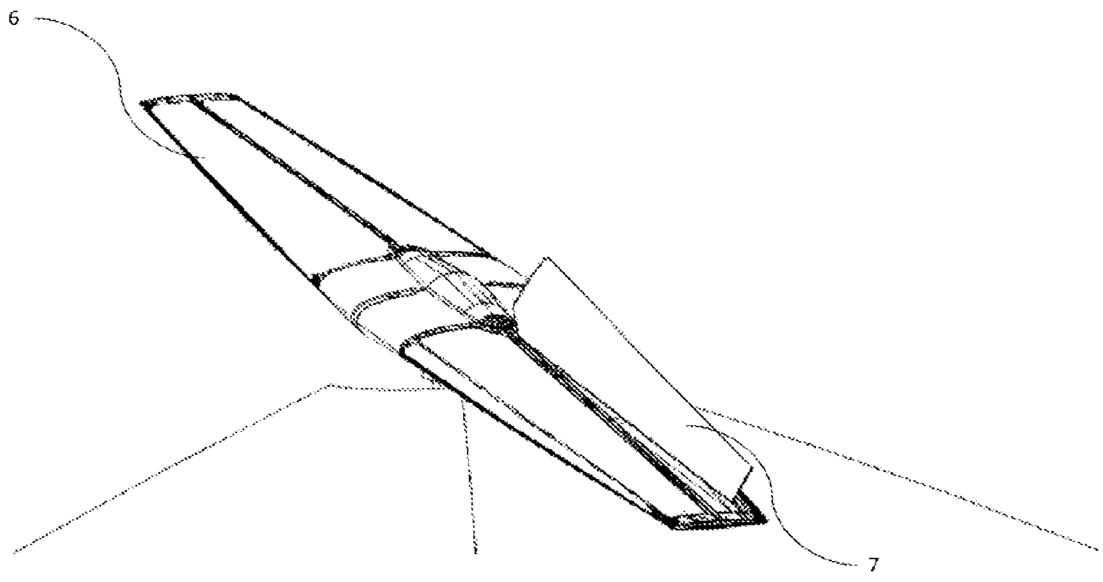
FIG. 1 is a perspective view of the flap in the open position (O) and closed position (C).

All the parts illustrated in figures are individually assigned a reference numeral and the corresponding terms of these numbers are listed below:

1. Air vehicle
2. Body
3. Engine
4. Rotor
5. Shaft
6. Blade
7. Flap
8. Fastener
9. Triggering device
10. Protrusion
11. Bracket
12. Opening
13. Pin
14. Spring
15. Actuator
16. Control unit
17. Brake system
18. Sensor
19. Support arm
(O) Open position
(C) Closed position
(I) First position
(II) Second position An air vehicle (1) comprises a body (2); at least one engine (3) on the body (2), which generates the necessary force for the flight of the air vehicle (1); at least one rotor (4) capable of rotating around itself, connected with the engine (3), and extending outward from the body (2); at least one shaft (5) in the rotor (4), which is triggered by the engine (3) and rotates around an axis along which it extends; a plurality of blades (6) connected with the shaft (5), which are triggered by the shaft (5) to move; at least one flap (7) located on the blade (6) and applying a drag force to the rotor due to its position on the blade; a closed position (C) in which the flap (7) almost completely corresponds to the aerodynamic surface of the blade (6); an open position (O) to which the flap (7) moves from the closed position (C) and in which the flap (7) extends outward from the blade (6) and increases the drag force acting on the rotor (4); a plurality of fasteners (8) in the blade (6) that allow the flaps (7) to be attached to the blade (6) movably (FIG. 1).

Figure 2:
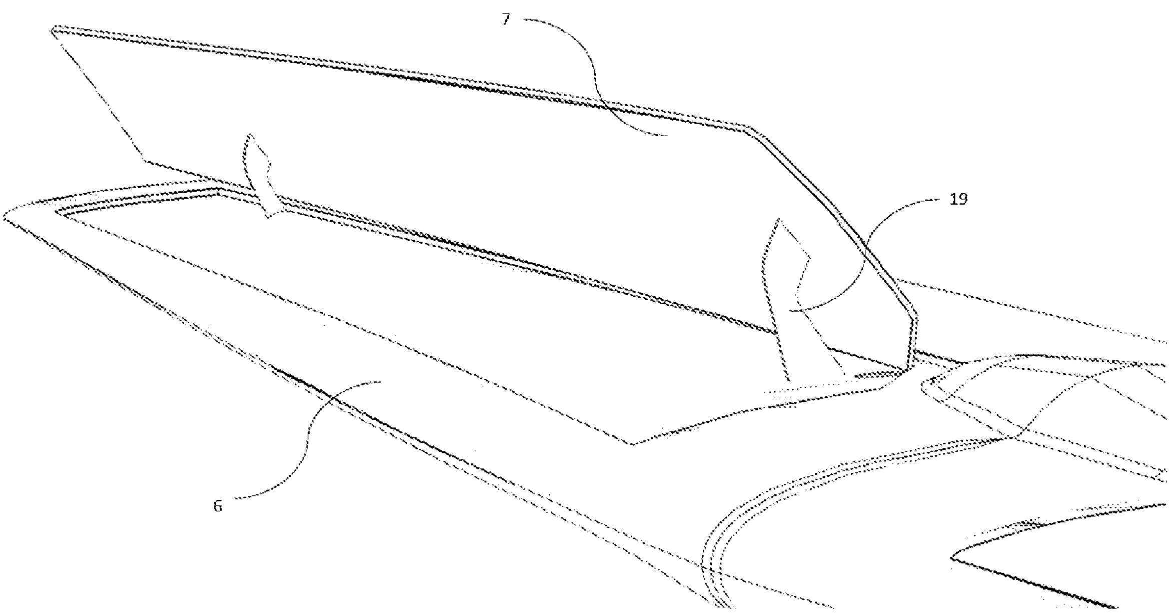
FIG. 2 is a perspective view of the flap in the open position (O).
Figure 3:
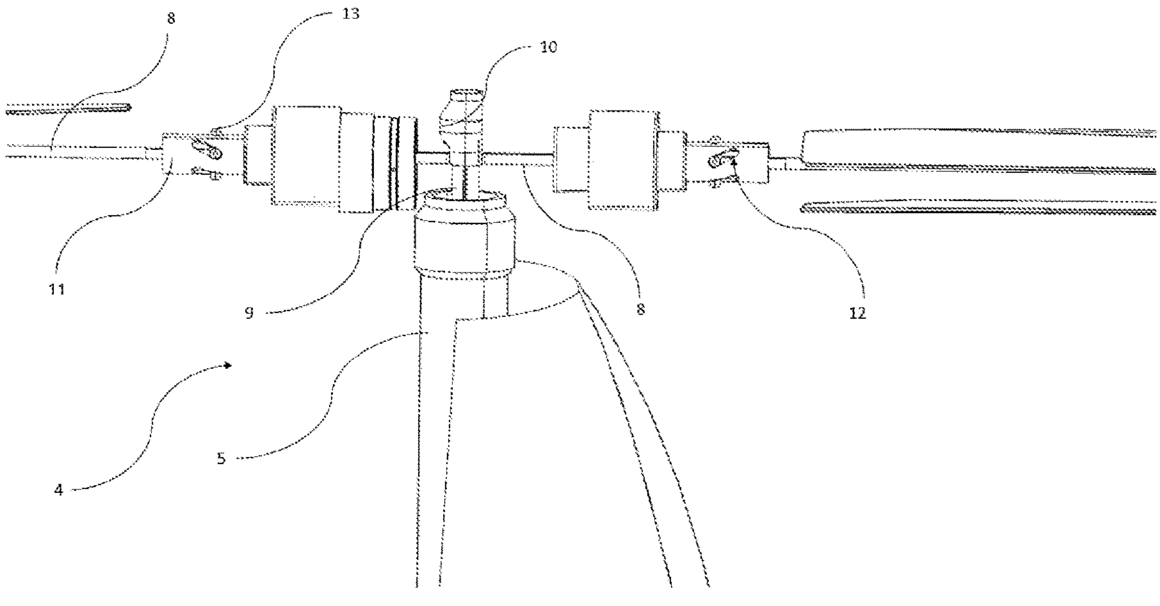
FIG. 3 is a side view of the protrusion and triggering device in the second position.
Figure 4:
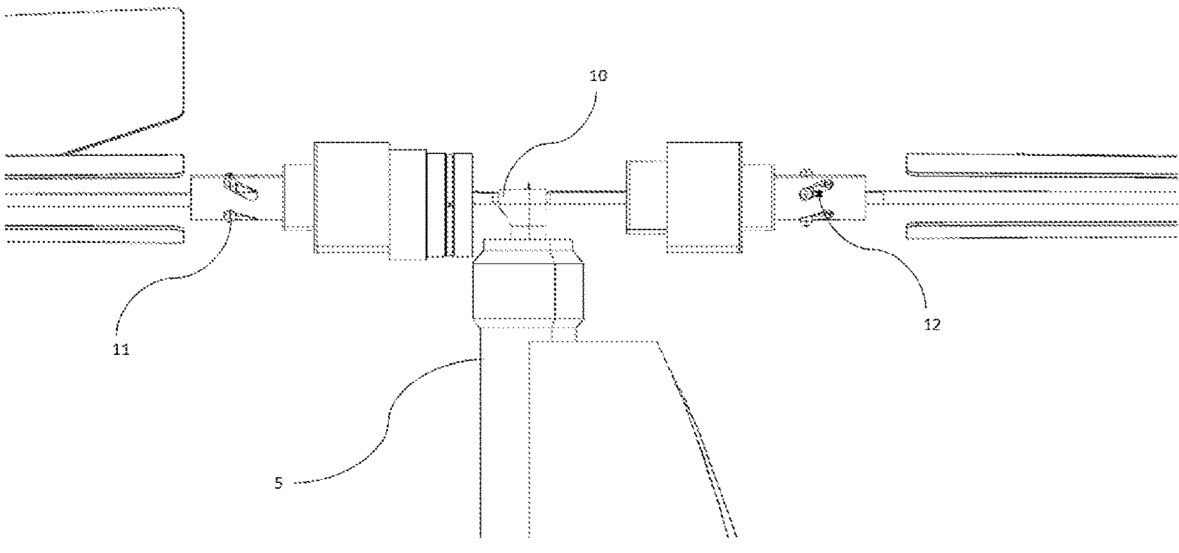
FIG. 4 is a side view of the protrusion and triggering device in the first position.

The air vehicle (1) according to the invention comprises at least one triggering device (9) in connection with the shaft (5), which rotates the fasteners (8) around their own axis and simultaneously moves them in the blade (6) along the direction they extend, thereby allowing the flap (7) to move between the closed position (C) and the open position (O) on the blade (6) (FIG. 2, FIG. 3, FIG. 4).

The force required for the flight of the air vehicle (1) is generated by the engine (3). The power transferred by the shaft (5) in the rotor (4) and the aerodynamic forces provided by the blades (6) rotating around the axis of the rotor (4) enables the body (2) to be carried and flown. The moving flaps (7) on the blade (5) provide the drag force to the rotor (4). There is a closed position (C) in which the flap (7) almost completely corresponds to the aerodynamic surface of the blade (6); and an open position (O) to which the flap (7) moves from the closed position (C) and in which the flap (7) extends outward from the blade (6) and increases the drag force acting on the rotor (4). Rotational speed of the rotor (4) is decreased when the blade (7) moves from the closed position (C) to the position (O). The fastener (8) and the flaps (7) are mounted on the blades (6).

Depending on the rotational movement of the blades (6), the triggering device (9) moves the fasteners (8) in the blade (6) around their own axis, simultaneously, in the closed position (C) along the direction they extend in the blade, so that the flaps (7) are moved from the closed position (C) to the open position (O) in which they extend outward from the blade (6). As the flaps (7) move to the open position (O), the drag force of the blade (6) and rotor (4) increases. In this way, the rotational speed of the rotor (4) is decreased, and then stopped completely.

In an embodiment of the invention, the air vehicle (1) comprises the triggering device (9) which brings the flaps (7) only on the advanced side of the blade (6) to the open position (O) respectively, depending on the direction of movement of the air vehicle (1) during the rotation of the rotor (4), thereby creating drag and providing gradual braking for the rotor (4). Thanks to the flaps (7), in order to stop the rotating blade (6) in an advancing air vehicle (1), when the flaps (7) are opened on the advanced side of the blade (6), the air flow resulting from its forward movement creates drag, thereby providing gradual braking for the rotor (4). During the rotation of the blade (6), when the blade (6) is positioned the receding side, the flaps (7) are closed to prevent the acceleration of the blade (6) by the flow in the opposite direction. While the flaps (7) are rotating around the rotor (4), they are periodically positioned in the open position (O) and closed position (C), thereby providing braking for the rotor (4).

In an embodiment of the invention, the air vehicle (1) comprises the triggering (9) device extending along the shaft (5), in a movable manner relative to the shaft (5); at least one protrusion (10) extending outward from the triggering device (9); a first position (I) in which the protrusion (10) contacts with the fasteners (8) and moves the fasteners (8) in the blade (6) to trigger them by the triggering device (9); a second position (II) to which the triggering device (9) is moved from the first position (I) along the direction it extends in the shaft (5), and in which the contact of the protrusion (10) with the fasteners (8) is prevented. By moving only one triggering device (9) extending in the shaft (5), all the fasteners (8) in the air vehicle (1) are triggered sequentially and switched from the closed position (C) to the open position (O). Therefore, the mechanism developed to decelerate the rotor (4) can be simplified and lightened.

Figure 5:
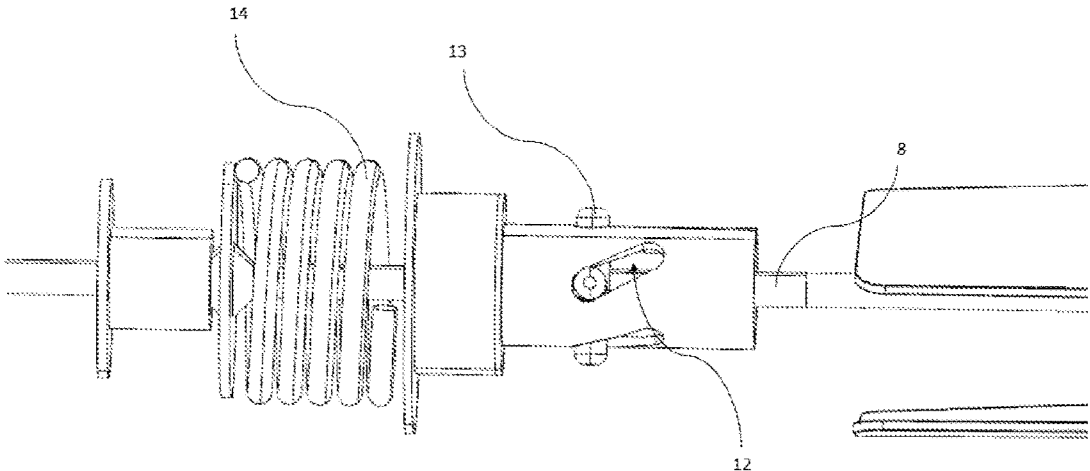
FIG. 5 is a side view of the spring, bracket and slot.

In an embodiment of the invention, the air vehicle (1) comprises at least one bracket (11) located between the fastener (8) and the rotor (4); at least one opening (12) in helical form on the bracket (11); at least one pin (13) that extends outward from the fastener (8) and enables the fastener (8) to rotate around its own axis throughout the opening (12) when a force is applied to the fastener (8), while simultaneously enabling the fastener (8) to move in the blade (6) in a direction it extends. Thanks to the opening (12) on the bracket (11) and the pin (13) extending from the fastener (8) into the opening (12), the horizontal force transferred to the fastener (8) by the protrusion (10) is converted into a force that rotates the fastener (8) around its own axis. The movement of the flaps (7) can be controlled by rotating the fastener (8) around its own axis (FIG. 5).

In an embodiment of the invention, the air vehicle (1) comprises at least one spring (14) on the fastener (8), which moves the fastener (8) from the open position (O) to the closed position (C) when the force applied by the triggering device (9) on the fastener (8) is removed. Thanks to the spring (14), the flap (7) is automatically moved to the closed position (C) in a mechanical manner (FIG. 5).

Figure 6:
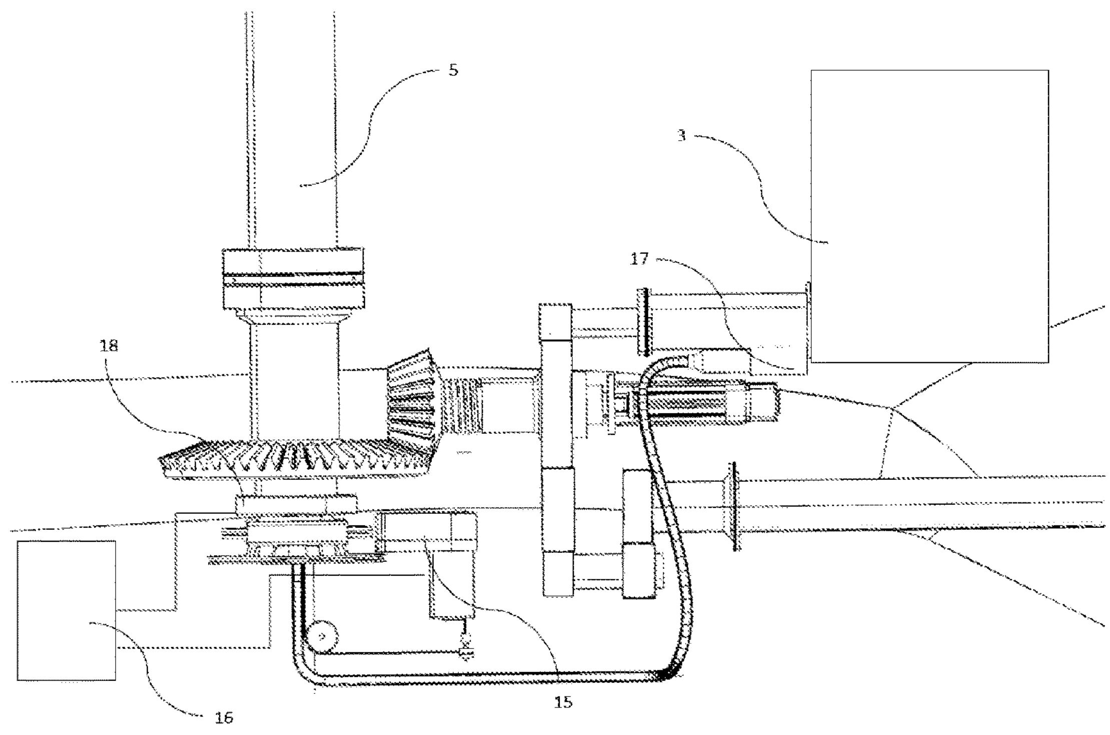
FIG. 6 is a side view of the control unit, engine and brake system.
Figure 7:
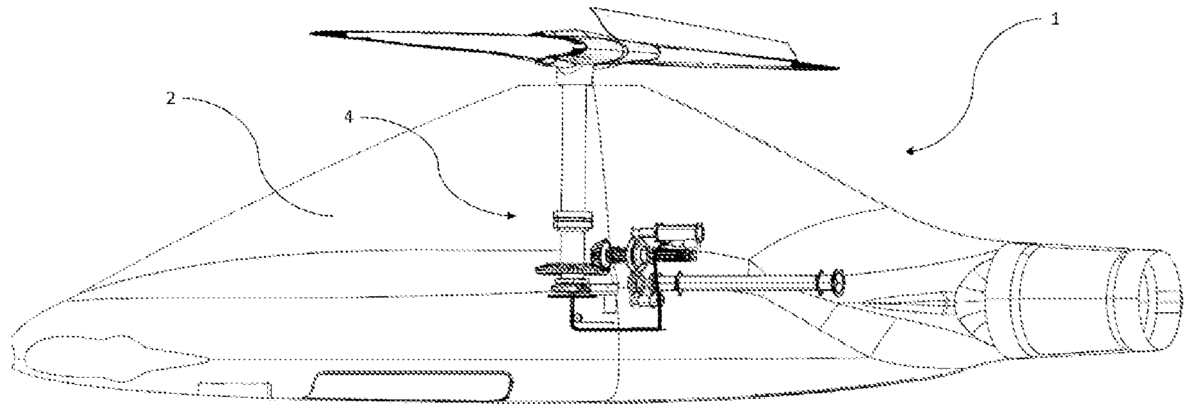
FIG. 7 is a side view of the air vehicle and rotor.

In an embodiment of the invention, the air vehicle (1) comprises an actuator (15) that moves the triggering device (9) in a direction it extends along the shaft (5); a control unit (16) that enables the actuator (15) to be activated automatically or by a user input. When the rotor (4) is required to be decelerated according to the scenarios previously input into the control unit (16) or according to the user's request, such commands are carried out by the control unit (16) (FIG. 6, FIG. 7).

In an embodiment of the invention, the air vehicle (1) comprises a brake system (17) on the body (2) that allows the rotor (4) to be stopped completely; at least one sensor (18) that measures a rotation speed of the rotor (4) and transmits the obtained data to the control unit (16); the control unit (16) triggering the brake system (17) to stop the rotor (4) completely according to the data received from the sensor (18), when the rotation speed of the rotor (4) reaches a rotation speed value predetermined by the user. As the brake system (17) is triggered by the control unit (16) when the rotation speed of the rotor (4) measured by the sensor (18) on the body (2) is decreased, by means of the blades (7), to the speed values determined by the user, the rotor (4) can be stopped completely.

In an embodiment of the invention, the air vehicle (1) comprises the control unit (16) that decelerates and stops the rotor (4) completely by the steps of: interrupting the force transferred to the rotor (4) by the engine (3) when transmission clutch is released; moving the triggering device (9) by the actuator (15) from the second position (II) to the first position (I); contacting the protrusion (10) with the fasteners (8) to rotate the fasteners (8) around their own axis along the opening (12), while simultaneously moving them along the direction they extend in the blade (6); moving the flap (7) in the advanced side of the blade (6) from the closed position (C) to the open position (O); interrupting the contact of the protrusion (10) with the fastener (8) in the receding side of the blade (6) and retracting the fastener (8) by the spring (14) such that the flap (7) is moved from the open position (O) to the closed position (C); activating the brake system (17) to stop the rotor (4) completely, when the rotation speed of the rotor (4) falls below a speed determined by the user; moving the triggering device (9) by the actuator (15) from the first position (I) to the second position (II).

In an embodiment of the invention, the air vehicle (1) comprises a plurality of protrusions (10) on the triggering device (9), which extend outward from the triggering device (9) such that their dimensions decrease gradually in the direction in which the triggering device (9) extends along the shaft (5). Since the fasteners (8) are triggered by using protrusions (10) of different sizes, the opening times of the flaps (7) on the blade (6), together with the opening amount in the open position (O) can be controlled.

In an embodiment of the invention, the air vehicle (1) comprises flaps (7) with an elliptical cross-section almost completely corresponding to the surface of the blade (6). Since the elliptical flaps (7) have the same geometry as the blades (6) on both the trailing edge and the leading edge, the blades (6) can be fixed on the air vehicle (1) to serve as wings.

In an embodiment of the invention, the air vehicle (1) comprises at least one support arm (19) which is located on the blade (6), in connection with the fastener (8), and which enables the movement of the fastener (8) to be transferred to the flap (7) to keep the flap (7) in the open position (O). Thanks to the support arm (19), the flaps (7) remain fixed in the open position (O) when the blade (6) is on the advanced side.

In an embodiment of the invention, the air vehicle (1) comprises the pin (13) moving along the opening (12), wherein the walls of the opening (12) restricts movement of the pin (13). Therefore, the movements of the fastener (8)

and the maximum length that the flap (7) extends from the blade (6) when in the open position (O), are restricted.

The invention claimed is:

1. An air vehicle comprising:

a body;

an engine mounted on the body, the engine configured to generate force for flight of the air vehicle;

a rotor coupled with the engine and extending outward from the body, the rotor configured to rotate around itself;

a shaft positioned within the rotor, the shaft configured to be driven by the engine and to rotate around an axis along which the shaft extends;

a plurality of blades connected with the shaft, each blade of the plurality of blades configured to be driven by the shaft to move;

a plurality of flaps, wherein each flap of the plurality of flaps is located on a respective blade of the plurality of blades, each flap configured to apply a drag force to the rotor based on a position of the flap on the respective blade;

wherein each flap has a closed position in which the flap corresponds to an aerodynamic surface of the respective blade without extending outward from the respective blade;

wherein each flap has an open position to which the flap moves from the closed position, wherein in the open position the flap extends outward from the respective blade and increases the drag force acting on the rotor;

a plurality of fasteners positioned in the plurality of blades, wherein the plurality of fasteners allow the plurality of flaps to be attached to the plurality of blades movably; and a triggering member extending along the shaft and mechanically coupled with the shaft, the triggering member being movable relative to the shaft in a direction parallel to the axis of the shaft, the triggering member comprising at least one protrusion extending outward from the triggering member, wherein the triggering member is configured to contact the plurality of fasteners via the at least one protrusion to simultaneously rotate the plurality of fasteners around respective axes of the plurality of fasteners and move the plurality of fasteners in the plurality of blades along respective directions in which the plurality of fasteners extend, thereby allowing the plurality of flaps to move between the closed position and the open position on the plurality of blades, wherein the triggering member is configured to bring each flap positioned on an advanced side of a respective blade to the open position in sequence depending on a direction of movement of the air vehicle during rotation of the rotor, thereby creating drag for the rotor.

2. The air vehicle according to claim 1, wherein the triggering member has: a first position in which the at least one protrusion contacts at least one fastener of the plurality of fasteners and moves the at least one fastener in a respective blade; and a second position to which the triggering member moves from the first position along the direction parallel to the axis of the shaft, and in which contact of the at least one protrusion with the plurality of fasteners is prevented.

3. The air vehicle according to claim 2, wherein the triggering member comprises a plurality of protrusions extending outward from the triggering member, wherein the plurality of protrusions have different dimensions from each other, with dimensions of the plurality of protrusions decreasing in the direction in which the triggering member extends from the first position toward the second position along the shaft.

4. The air vehicle according to claim 1, further comprising: a plurality of brackets, wherein each bracket of the plurality of brackets is located between a respective fastener of the plurality of fasteners and the rotor; wherein each bracket comprises an opening in a helical form; and a plurality of pins, wherein each pin of the plurality of pins extends outward from a respective fastener of the plurality of fasteners into a respective opening of a respective bracket, wherein each pin is configured to slide within the respective opening when a force is applied to the respective fastener, thereby enabling the respective fastener to rotate around the respective axis of the respective fastener and simultaneously enabling the respective fastener to move in a respective blade in the respective direction in which the respective fastener extends.

5. The air vehicle according to claim 4, wherein each pin is configured to move along the respective opening, wherein walls of the respective opening restrict movement of the respective pin.

6. The air vehicle according to claim 1, further comprising a plurality of springs, wherein each spring of the plurality of springs is positioned on a respective fastener of the plurality of fasteners, each spring configured to move the respective fastener from the open position to the closed position when a force applied by the triggering member on the respective fastener is removed.

7. The air vehicle according to claim 1, wherein each flap of the plurality of flaps has an elliptical cross-section that corresponds to a surface of a respective blade of the plurality of blades.

8. The air vehicle according to claim 1, further comprising a plurality of support arms, each support arm of the plurality of support arms located on a respective blade in connection with a respective fastener, each support arm configured to transfer movement of the respective fastener to a respective flap to keep the respective flap in the open position.

* * * * *